(12) United States Patent
Rahman et al.

(10) Patent No.: US 8,760,025 B2
(45) Date of Patent: Jun. 24, 2014

(54) INTERIOR PERMANENT MAGNET MACHINE HAVING OFF AXIS CENTERED ARC GEOMETRY

(75) Inventors: Khwaja M. Rahman, Troy, MI (US); Sinisa Jurkovic, Sterling Heights, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 133 days.

(21) Appl. No.: 13/570,721

(22) Filed: Aug. 9, 2012

(65) Prior Publication Data

US 2014/0042860 A1 Feb. 13, 2014

(51) Int. Cl.
*H02K 21/12* (2006.01)
(52) U.S. Cl.
USPC ............. 310/156.38; 310/156.57; 310/156.53
(58) Field of Classification Search
USPC ....................................... 310/156.38–156.57
See application file for complete search history.

(56) References Cited

U.S. PATENT DOCUMENTS

| | | | | |
|---|---|---|---|---|
| 6,300,700 B1 * | 10/2001 | Nishiyama et al. | ...... | 310/156.45 |
| 6,437,473 B1 * | 8/2002 | Mobius et al. | ........... | 310/156.21 |
| 6,979,924 B2 * | 12/2005 | Nishiyama et al. | ...... | 310/156.53 |
| 7,902,711 B2 * | 3/2011 | Blissenbach et al. | .... | 310/156.53 |
| 7,932,658 B2 * | 4/2011 | Ionel | ........................ | 310/156.52 |
| 8,227,953 B2 * | 7/2012 | Suzuki et al. | ............ | 310/156.53 |
| 8,269,392 B2 * | 9/2012 | Doi et al. | ................. | 310/156.53 |
| 2009/0045688 A1 * | 2/2009 | Liang et al. | ............. | 310/156.07 |

* cited by examiner

*Primary Examiner* — Thanh Lam
(74) *Attorney, Agent, or Firm* — Quinn Law Group, PLLC

(57) ABSTRACT

A rotor core defines a plurality of cavities, and includes one magnet disposed within each cavity. Each magnet includes a cross section that defines an arcuate shape having an arc center. The magnets are arranged about a pole axis to define a first group of magnets disposed on a first side of the pole axis, and a second group of magnets disposed on a second side of the pole axis. The arc centers of each of the magnets of the first group of magnets and the second group of magnets are spaced from each other and are spaced from the pole axis. The plurality of magnets is arranged in a plurality of layers. The arc centers of each of the magnets in each of the layers are spaced from each other.

20 Claims, 2 Drawing Sheets

US 8,760,025 B2

INTERIOR PERMANENT MAGNET MACHINE HAVING OFF AXIS CENTERED ARC GEOMETRY

TECHNICAL FIELD

The invention generally relates to an internal permanent magnet machine, and more particularly to a rotor assembly for the internal permanent magnet machine.

BACKGROUND

Interior Permanent Magnet (IPM) machines generally include a rotor having a plurality of magnets of alternating polarity around an outer periphery of the rotor. The rotor is rotatable within a stator which generally includes a plurality of windings and magnetic poles of alternating polarity.

An IPM machine may use either ferrite magnets or rare earth magnets, such as NdFeB. Ferrite magnets are less expensive, but produce a lower performance compared to rare earth magnets when utilized in identically configured IPM machines. In order to increase the performance of IPM machines using ferrite magnets, the ferrite magnets must be buried deep inside the rotor core, near a center of the rotor, such that a large amount of magnetic material may be packed in the rotor. However, when utilizing conventional arc magnet geometry, in which a radial center of arcuate shaped magnets within a pole of the rotor are arranged concentric with each other, the number of poles of the internal permanent magnet machines must be reduced to accommodate a larger circumferential length of each pole. Additionally, radially outer layers of magnets within a pole of the rotor are small with a sharp radius, which are difficult and expensive to produce and assemble.

SUMMARY

An interior permanent magnet machine is provided. The interior permanent magnet machine includes a wound stator and a rotor core. The rotor core includes at least one pole, and defines a plurality of cavities in the at least one pole. The rotor core is configured for magnetically interacting with the wound stator to rotate about an axis of rotation. The interior permanent magnet machine further includes a plurality of magnets. One of the plurality of magnets is disposed within each of the plurality of cavities in the at least one pole. Each of the plurality of magnets of the at least one pole includes a cross section perpendicular to the axis of rotation that defines an arcuate shape having an arc center. The arc centers of each of the plurality of magnets of the at least one pole are spaced from each other and are spaced from a pole axis extending radially outward from the axis of rotation.

A rotor assembly is also provided. The rotor assembly includes a rotor core having at least one pole. The rotor core defines a plurality of cavities in the at least one pole. The rotor core is configured for rotation about an axis of rotation. The rotor assembly further includes a plurality of magnets. One of the plurality of magnets is disposed within each of the plurality of cavities in the at least one pole. Each of the plurality of magnets of the at least one pole includes a cross section perpendicular to the axis of rotation that defines an arcuate shape having an arc center. The plurality of magnets of the at least one pole is arranged symmetrically about a pole axis. The pole axis extends radially outward from the axis of rotation to define a first group of magnets disposed on a first side of the pole axis, and a second group of magnets disposed on a second side of the pole axis. The arc centers of each of the plurality of magnets of the first group of magnets and the second group of magnets are spaced from each other and are spaced from the pole axis. The plurality of magnets of the at least one pole are arranged in a plurality of layers spaced from each other relative to the axis of rotation. The arc centers of each of the plurality of magnets in each of the plurality of layers are spaced from each other.

Accordingly, the magnets of each pole are arranged in a circumferentially compact configuration allowing the magnets of each pole to extend radially nearer the center of the rotor core, i.e., nearer the axis of rotation, without limiting the number of poles of the rotor assembly. Furthermore, the radially outer most layers of magnets within each pole include a radius of arc curvature that is less than in conventional arc magnet geometries, thereby reducing manufacturing and assembly complexity, and reducing the cost of the magnets, The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an Interior Permanent Magnet machine is generally shown at 20. The IPM machine 20 may include, but is not limited to an electric motor or other similar device.

Figure 1:
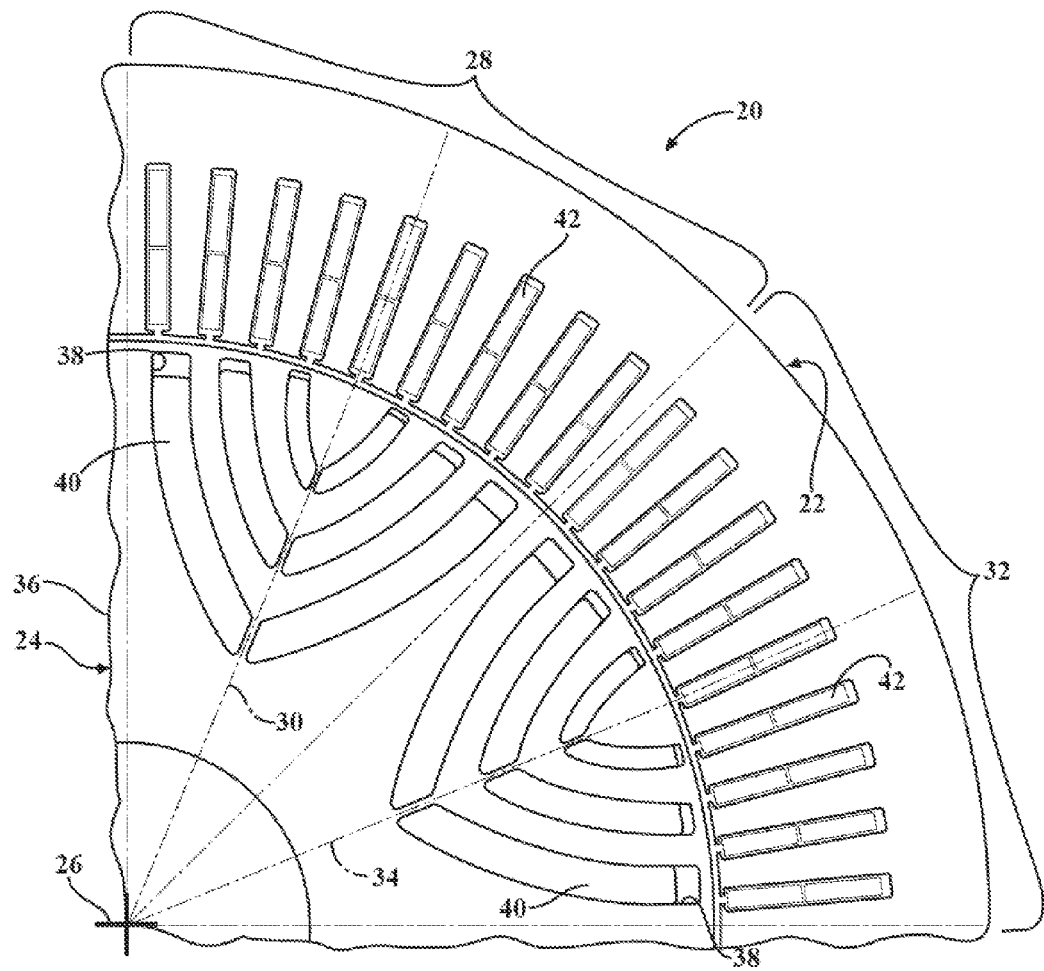
FIG. 1 is a schematic fragmentary cross sectional view of an Internal Permanent Magnet (IPM) machine.

Referring to FIG. 1, the IPM machine 20 includes a wound stator 22 and a rotor assembly 24. The rotor assembly 24 is configured for magnetically interacting with the wound stator 22 to rotate relative to the wound stator 22 about an axis of rotation 26. As shown, the rotor assembly 24 includes a first pole 28 defined by a first pole axis 30, and a second pole 32 defined by a second pole axis 34. The first pole axis 30 and the second pole axis 34 extend radially outward from the axis of rotation 26 through a center of the first pole 28 and the second pole 32 respectively. While only the first pole 28 and the second pole 32 are shown, the rotor assembly 24 may include any even number of poles.

The rotor assembly 24 includes a rotor core 36 that defines a plurality of cavities 38. Each pole includes an equal number of cavities 38 therein, arranged in an identical orientation. The cavities 38 extend three-dimensionally into the rotor core 36. The axis of rotation 26 is disposed at a center of the rotor core 36. The cavities 38 may include cutouts, slots, etc. The rotor assembly 24 further includes a plurality of magnets 40, with one of the plurality of magnets 40 disposed within each of the plurality of cavities 38. It should be appreciated that the magnets 40 and the cavities 38 include substantially corresponding cross sectional shapes perpendicular to the axis of rotation 26. The magnets 40 may completely fill the cavities 38, or may leave one or more air gaps between the magnet and the cavity. The wound stator 22 includes a plurality of windings 42 that magnetically interact with the magnets 40 disposed within the cavities 38 of the poles of the rotor core 36 to generate torque, and cause rotation of the rotor core 36 about the axis of rotation 26 relative to the wound stator 22.

The magnets 40 may include any type of magnetic material suitable for use in the IPM machine 20. For example, each of the magnets 40 may be manufactured from and include a ferrite magnet, an Alnico magnet, or alternatively from a rare earth magnet, such as but not limited to Neodymium iron boron (NdFeB).

The shape and orientation of the magnets 40 and the cavities 38 is described in detail below with reference to FIG. 2. While the description provided herein is limited to the first pole 28 shown in FIG. 2, it should be appreciated that all poles of the rotor assembly 24 may be identical to the orientation described herein with reference to the first pole 28 shown in FIG. 2. However, it should be appreciated that each pole may differ slightly from the orientation of the first pole 28 described herein.

Figure 2:
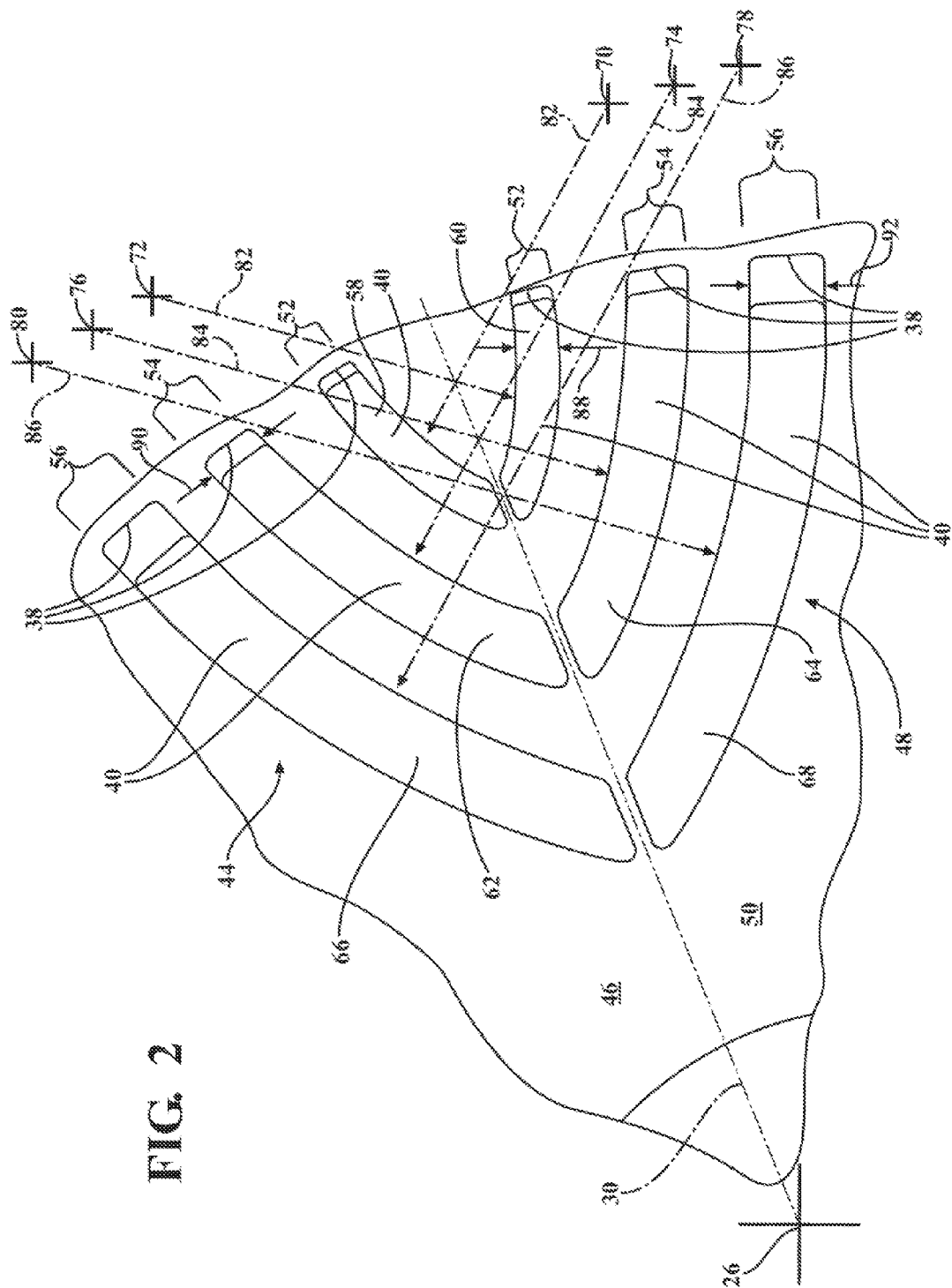
FIG. 2 is an enlarged schematic fragmentary cross sectional view of the IPM machine.

Referring to FIG. 2, each of the magnets 40 includes a cross section perpendicular to the axis of rotation 26 that defines an arcuate shape having an arc center. The magnets 40 of the first pole 28 may be, but are not required to be, arranged symmetrically about the first pole axis 30 to define a first group 44 of magnets 40 and a second group 48 of magnets 40. The first group 44 of magnets 40 is disposed on a first side 46 of the first pole axis 30, and the second group 48 of magnets 40 is disposed on a second side 50 of the first pole axis 30. The first group 44 of magnets 40 and the second group 48 of magnets 40 may be, but are not required to be, mirror images of each other across the first pole axis 30. Each of the magnets 40 of the first group 44 of magnets 40 is completely disposed on the first side 46 of the first pole axis 30. Similarly, each of the magnets 40 of the second group 48 of magnets 40 is completely disposed on the second side 50 of the first pole axis 30.

The cavities 38 defined by the rotor core 36 in the first pole 28 are arranged in one or more layers spaced relative to the axis of rotation 26, with each layer spaced from the other layers. As shown in the Figures, the cavities 38 define three layers, i.e. a first layer 52 or radially outermost layer relative to the axis of rotation 26, a second layer 54 or radially middle layer, and a third layer 56 or radially innermost layer relative to the axis of rotation 26. However, it should be appreciated that the cavities 38 may define only a single layer, or may define more than the three layers shown. Furthermore, each layer may include any number of cavities 38 therein. As shown, the first layer 52 includes two cavities 38, the second layer 54 includes two cavities 38, and the third layer 56 includes two cavities 38. However, the number of cavities 38 in each layer may differ from the exemplary embodiment shown.

Referring to FIG. 2, the first pole 28 includes a first magnet 58 disposed in the first layer 52 of the first group 44 of magnets 40, a second magnet 60 disposed in the first layer 52 of the second group 48 of magnets 40, a third magnet 62 disposed in the second layer 54 of the first group 44 of magnets 40, a fourth magnet 64 disposed in the second layer 54 of the second group 48 of magnets 40, a fifth magnet 66 disposed in the third layer 56 of the first group 44 of magnets 40, and a sixth magnet 68 disposed in the third layer 56 of the second group 48 of magnets 40. The arc center of the first magnet 58 is identified by reference point 70, the arc center of the second magnet 60 is identified by reference point 72, the arc center of the third magnet 62 is identified by reference point 74, the arc center of the fourth magnet 64 is identified by reference point 76, the arc center of the fifth magnet 66 is identified by reference point 78, and the arc center of the sixth magnet 68 is identified by reference point 80. The first group 44 of magnets 40 includes the first magnet 58, the third magnet 62 and the fifth magnet 66. The second group 48 of magnets 40 includes the second magnet 60, the fourth magnet 64 and the sixth magnet 68. The first layer 52 of magnets 40 includes the first magnet 58 and the second magnet 60. The second layer 54 of magnets 40 includes the third magnet 62 and the fourth magnet 64. The third layer 56 of magnets 40 includes the fifth magnet 66 and the sixth magnet 68.

The arc centers of each of the magnets 40 within the first pole 28 are spaced from each other and are spaced from the first pole axis 30. The arc centers of the magnets 40 of the first group 44 of magnets 40 are disposed on the second side 50 of the first pole axis 30. Similarly, the arc centers of the magnets 40 of the second group 48 of magnets 40 are disposed on the first side 46 of the pole axis.

The arc centers of each of the magnets 40 in each of the first layer 52, the second layer 54 and the third layer 56 are spaced from each other. Each magnet of the first layer 52 of magnets 40 includes a first radius 82, each magnet of the second layer 54 of magnets 40 includes a second radius 84, and each magnet of the third layer 56 of magnets 40 includes a third radius 86. The third radius 86 is greater than the second radius 84, and the second radius 84 is greater than the first radius 82. Preferably, the first radius 82, the second radius 84 and the third radius 86 each include a value between the range of 20 mm and 60 mm. However, it should be appreciated that the value of the first radius 82, the second radius 84 and the third radius 86 may differ from the exemplary range provided herein.

Each layer of the plurality of layers of magnets 40 includes a thickness. As shown in FIG. 2, the first layer 52 of magnets 40 include a first thickness 88, the second layer 54 of magnets 40 include a second thickness 90, and the third layer 56 of magnets 40 include a third thickness 92. Accordingly, each magnet in each layer includes the same thickness. The thickness of the magnets 40 in each layer is different. As shown, the thickness of the magnets 40 in each layer of magnets 40 decreases with an increase in the radial distance from the axis of rotation 26. Accordingly, the first thickness 88 of the first layer 52 of magnets 40 is smaller than the second thickness 90 of the second layer 54 of magnets 40, and the second thickness 90 of the second layer 54 of magnets 40 is smaller than the third thickness 92 of the third layer 56 of magnets 40. Preferably, the first thickness 88 for the first layer 52 of magnets 40, the second thickness 90 of the second layer 54 of magnets 40, and the third thickness 92 of the third layer 56 of magnets 40 is between the range of 2 mm and 5 mm. However, it should be appreciated that the value of the first thickness 88, the second thickness 90 and the third thickness 92 may differ from the exemplary range provided herein.

The above described orientation and positioning of the cavities 38 and the magnets 40 within each pole allows the magnets 40 to be positioned nearer the axis of rotation 26, i.e., the center of the rotor core 36, without increasing a circumferential width of each pole. Accordingly, the magnets 40 may be positioned nearer the center of the rotor core 36 without reducing the number of poles in the rotor assembly 24. Furthermore, the above described orientation of the cavities 38 and magnets 40 allows the magnets 40 of the first layer 52 to include a much larger radius of curvature, thereby simplifying the manufacture of the magnets 40 and installation of the magnets 40 into the rotor core 36.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
a wound stator;
a rotor core including at least one pole, and defining a plurality of cavities in the at least one pole, wherein the rotor core is configured for magnetically interacting with the wound stator to rotate about an axis of rotation; and
a plurality of magnets, with one of the plurality of magnets disposed within each of the plurality of cavities in the at least one pole;
wherein each of the plurality of magnets of the at least one pole include a cross section perpendicular to the axis of rotation defining an arcuate shape having an arc center; and
wherein the arc centers of each of the plurality of magnets of the at least one pole are spaced from each other and are spaced from a pole axis extending radially outward from the axis of rotation.

2. An interior permanent magnet machine as set forth in claim 1 wherein the plurality of magnets of the at least one pole are arranged about the pole axis to define a first group of magnets disposed on a first side of the pole axis and a second group of magnets disposed on a second side of the pole axis.

3. An interior permanent magnet machine as set forth in claim 2 wherein the first group of magnets and the second group of magnets are mirror images of each other across the pole axis.

4. An interior permanent magnet machine as set forth in claim 2 wherein each of the magnets of the first group of magnets is completely disposed on the first side of the pole axis, and wherein each of the magnets of the second group of magnets is completely disposed on the second side of the pole axis.

5. An interior permanent magnet machine as set forth in claim 4 wherein the arc centers of the magnets of the first group of magnets are disposed on the second side of the pole axis, and wherein the arc centers of the magnets of the second group of magnets are disposed on the first side of the pole axis.

6. An interior permanent magnet machine as set forth in claim 1 wherein the plurality of magnets of the at least one pole are arranged in at least one layer of magnets spaced relative to the axis of rotation.

7. An interior permanent magnet machine as set forth in claim 6 wherein the arc centers of each of the plurality of magnets in each of the at least one layer are spaced from each other.

8. An interior permanent magnet machine as set forth in claim 7 wherein the at least one layer of magnets includes a first layer of magnets and a second layer of magnets.

9. An interior permanent magnet machine as set forth in claim 8 wherein each magnet of the first layer of magnets includes a first radius, wherein each magnet of the second layer of magnets includes a second radius, and wherein the second radius is greater than the first radius.

10. An interior permanent magnet machine as set forth in claim 9 wherein the at least one layer of magnets includes a third layer of magnets, with each magnet of the third layer of magnets having a third radius that is greater than the second radius.

11. An interior permanent magnet machine as set forth in claim 10 wherein the first radius, the second radius and the third radius each include a value between the range of 20 mm and 60 mm.

12. An interior permanent magnet machine as set forth in claim 6 wherein the at least one layer of magnets includes a plurality of layers, with each layer of magnets defining a different thickness.

13. An interior permanent magnet machine as set forth in claim 12 wherein the thickness of the magnets in each layer of magnets decreases with an increase in the radial distance from the axis of rotation.

14. An interior permanent magnet machine as set forth in claim 1 wherein each of the plurality of magnets includes a ferrite magnet.

15. A rotor assembly comprising:
a rotor core including at least one pole, and defining a plurality of cavities in the at least one pole, wherein the rotor core is configured for rotation about an axis of rotation; and
a plurality of magnets, with one of the plurality of magnets disposed within each of the plurality of cavities in the at least one pole;
wherein each of the plurality of magnets of the at least one pole include a cross section perpendicular to the axis of rotation defining an arcuate shape having an arc center;
wherein the plurality of magnets of the at least one pole are arranged symmetrically about a pole axis extending radially outward from the axis of rotation to define a first group of magnets disposed on a first side of the pole axis and a second group of magnets disposed on a second side of the pole axis;
wherein the arc centers of each of the plurality of magnets of the first group of magnets and the second group of magnets are spaced from each other and are spaced from the pole axis; and
wherein the plurality of magnets of the at least one pole are arranged in a plurality of layers spaced from each other relative to the axis of rotation, with the arc centers of each of the plurality of magnets in each of the plurality of layers spaced from each other.

16. A rotor assembly as set forth in claim 15 wherein each of the magnets of the first group of magnets is completely disposed on the first side of the pole axis, and wherein each of the magnets of the second group of magnets is completely disposed on the second side of the pole axis.

17. A rotor assembly as set forth in claim 16 wherein the arc centers of the magnets of the first group of magnets are disposed on the second side of the pole axis, and wherein the arc centers of the magnets of the second group of magnets are disposed on the first side of the pole axis.

18. A rotor assembly as set forth in claim 15 wherein the plurality of layers includes a first layer of magnets, a second layer of magnets, and a third layer of magnets, wherein each magnet of the first layer of magnets includes a first radius, each magnet of the second layer of magnets includes a second radius, and each magnet of the third layer of magnets includes a third radius, and wherein the third radius is greater than the second radius, and the second radius is greater than the first radius.

19. A rotor assembly as set forth in claim 18 wherein the first radius, the second radius and the third radius each include a value between the range of 20 mm and 60 mm.

20. A rotor assembly as set forth in claim 15 wherein each layer of the plurality of layers of magnets includes a different magnet thickness, and wherein the magnet thickness of the magnets in each layer of magnets decreases with an increase in the radial distance from the axis of rotation.

* * * * *